(12) United States Patent
Eberhard et al.

(10) Patent No.: US 7,410,509 B2
(45) Date of Patent: Aug. 12, 2008

(54) SPUTTERED RUTHENIUM OXIDE COATINGS IN ELECTROLYTIC CAPACITOR

(75) Inventors: Doug Eberhard, Grand Island, NY (US); Barry Muffoletto, Alden, NY (US); Wolfram Neff, Buffalo, NY (US)

(73) Assignee: Greatbatch Ltd., Clarence, NY (US)

( * ) Notice: Subject to any disclaimer, the term of this patent is extended or adjusted under 35 U.S.C. 154(b) by 290 days.

(21) Appl. No.: 11/306,907

(22) Filed: Jan. 16, 2006

(65) Prior Publication Data
US 2006/0198082 A1 Sep. 7, 2006

Related U.S. Application Data

(60) Provisional application No. 60/644,679, filed on Jan. 19, 2005.

(51) Int. Cl.
*H01G 9/00* (2006.01)

(52) U.S. Cl. .............. 29/25.01; 361/516; 361/523; 361/525; 361/528; 361/529

(58) Field of Classification Search ............. 29/25.01, 29/25.03, 25.41, 25.42; 361/523–525, 516–519, 361/528–534, 540
See application file for complete search history.

(56) References Cited

U.S. PATENT DOCUMENTS

| | | | |
|---|---|---|---|
| 3,879,278 A | 4/1975 | Grosewald et al. | |
| 5,098,485 A | 3/1992 | Evans | |
| 5,256,443 A | 10/1993 | Tomita | |
| 5,334,293 A | 8/1994 | Cairns et al. | |
| 5,585,776 A | 12/1996 | Anderson et al. | |
| 5,748,438 A | 5/1998 | Davis et al. | |
| 5,868,913 A | 2/1999 | Hodgson | |
| 5,894,403 A | 4/1999 | Shah et al. | |
| 5,920,455 A | 7/1999 | Shah et al. | |
| 5,926,362 A | 7/1999 | Muffoletto et al. | |
| 5,949,639 A * | 9/1999 | Maeda et al. ............ | 361/523 |
| 6,017,430 A | 1/2000 | Hodgson et al. | |
| 6,040,077 A | 3/2000 | Debe et al. | |
| 6,096,391 A | 8/2000 | Muffoletto et al. | |
| 6,139,696 A | 10/2000 | Arunachalam et al. | |
| 6,212,063 B1 * | 4/2001 | Johnson et al. ........... | 361/517 |
| 6,334,879 B1 | 1/2002 | Muffoletto et al. | |
| 6,500,315 B1 | 12/2002 | Arunachalam et al. | |
| 6,599,580 B2 | 7/2003 | Muffoletto et al. | |
| 6,740,420 B2 | 5/2004 | Muffoletto et al. | |
| 6,801,424 B1 * | 10/2004 | Nielsen et al. ........... | 361/517 |
| 6,952,339 B1 * | 10/2005 | Knowles .................. | 361/528 |
| 7,072,171 B1 * | 7/2006 | Muffoletto et al. ........ | 361/508 |
| 7,271,994 B2 * | 9/2007 | Stemen et al. ............ | 361/508 |
| 7,301,754 B1 * | 11/2007 | Knowles .................. | 361/508 |
| 2004/0083969 A1 | 5/2004 | Kijima et al. | |
| 2004/0240144 A1 | 12/2004 | Schott et al. | |
| 2004/0240155 A1 | 12/2004 | Miltich et al. | |
| 2005/0266261 A1 | 12/2005 | Muffoletto et al. | |

\* cited by examiner

*Primary Examiner*—Nguyen T Ha
(74) *Attorney, Agent, or Firm*—Michael F. Scalise

(57) ABSTRACT

A capacitor is described. the capacitor includes a casing; a cathode of an active material of at least an oxide of a first metal provided on a substrate, wherein the active material is characterized as being of a substantially homogeneous coating formed by sputtering a target of the first metal in a vacuum chamber; an anode spaced from the cathode coating; and an electrolyte in contact with the cathode coating and the anode. The casing contains the anode, the cathode and the electrolyte. A method and apparatus for providing the sputtered coating is also disclosed.

11 Claims, 2 Drawing Sheets

SPUTTERED RUTHENIUM OXIDE COATINGS IN ELECTROLYTIC CAPACITOR

FIELD OF THE INVENTION

The present invention generally relates to a deposition process for coating a substrate with a sputtered capacitive metal coating. More particularly, the present invention relates to a metallic foil provided with a sputtered coating of a capacitive material. Still more particularly, the present invention provides a high adhesion pseudocapacitive metal oxide coating on a conductive foil for use in an electrolytic capacitor.

PRIOR ART

In redox active structures, energy storage occurs during a change in the oxidation state of an active metal when an ionic species from a conducting electrolyte, for example a proton, reacts with the surface or bulk of the oxide. This chemisorption is accompanied by the simultaneous incorporation of an electron into the oxide. The surface (or bulk) interaction between the electrode and electrolyte gives rise to capacitance in the hundreds of microfarads/cm$^2$. It follows that a electrode with high specific surface area will store a significant amount of energy and will have a large specific capacitance. These structures are useful as cathode electrodes in electrolytic capacitors, which require high specific capacitances.

A cathode in an electrolytic capacitor generally includes a substrate of a conductive metal such as titanium or tantalum provided with a semiconductive or pseudocapacitive oxide coating, nitride coating, carbon nitride coating, or carbide coating. In the case of a ruthenium oxide cathode, the coating may be formed on the substrate by dissolving a ruthenium oxide precursor such as ruthenium chloride or ruthenium nitrosyl nitrate in a solvent. The solution is contacted to a substrate and heated to a temperature sufficient to convert the deposited precursor to a highly porous, high surface area pseudocapacitive coating of ruthenium oxide provided on the substrate.

The prior art describes various methods of contacting a substrate with a semiconductive or pseudocapacitive solution, or precursor thereof. Commonly used techniques include sol-gel deposition, screen printing, pad printing, dipping, pressurized air atomization spraying, and ultrasonic atomization spraying of the pseudocapacitive material onto the substrate. Several patents in particular have disclosed ultrasonically coated cathode active materials in electrolytic capacitors.

U.S. Pat. No. 5,894,403 to Shah et al., which is assigned to the assignee of the present invention and incorporated herein by reference, describes a deposition process for coating a substrate with an ultrasonically generated aerosol spray. The droplets of the ultrasonically generated spray are much smaller in size than those produced by conventional processes, thereby providing a coating having an increased surface area. When the coated substrate is used as an electrode in a capacitor, greater surface area results in an increased capacitance. U.S. Pat. No. 5,920,455 to Shah et al., which is also assigned to the assignee of the present invention and incorporated herein by reference, further describes a deposition process for coating a substrate with an ultrasonically generated aerosol spray of a pseudocapacitive material or a precursor thereof. The substrate is heated to a temperature to instantaneously solidify the pseudocapacitive material, or to convert the precursor to a solidified pseudocapacitive metal compound. U.S. Pat. No. 5,926,362 to Muffoletto et al., which is also assigned to the assignee of the present invention and incorporated herein by reference, describes a sealed capacitor that may be hermetic, and having a generally flat planar geometry. The capacitor includes at least one electrode provided by a metallic substrate having a capacitive material contacted thereto. The coated substrate can provide at least one of the casing side walls itself, or be connected to the side wall. A most preferred form of the capacitor has the conductive substrate provided with the capacitive material formed from an ultrasonically generated aerosol.

A preferred cathode coating for the capacitors disclosed in these patents is ruthenium oxide. One disadvantage of coatings such as of ruthenium oxide deposited by ultrasonic atomization spraying, and other aforementioned deposition techniques, is that adhesion to a conductive substrate is not as strong as is needed in certain applications. Environmental conditions encountered in military and/or aerospace applications may include extreme variations in temperature, as well as rough handling, i.e. high mechanical impact. The thermal and mechanical stresses produced in such environments may result in delamination or spalling of the cathode coating from its conductive substrate, resulting in performance degradation or failure of the capacitor. An electrolytic capacitor also typically includes a porous separator disposed between the anode and cathode. One function of the separator is to prevent contact that might occur when portions of a cathode coating delaminate or spall from the conductive substrate and are entrained in the liquid electrolyte. In that light, an additional benefit of highly adherent cathode coatings is that the separator may be eliminated from the capacitor structure. This provides additional volume for active materials, thereby increasing the capacitor's energy density.

Therefore, there is a need to further increase the adhesion of the coated cathode films to the conductive substrates of such capacitors.

SUMMARY OF THE INVENTION

Accordingly, embodiments of the present invention are provided that meet at least one or more of the following objects of the present invention.

It is an object of this invention to provide a method and apparatus for contacting a cathode coating with high adhesion to a conductive substrate in a capacitor.

It is a further object of this invention to provide a capacitor with a highly adherent cathode active material coated on a conductive substrate.

It is a further object of this invention to provide a capacitor with a high energy density enabled by a high relative proportion of active materials in the capacitor.

According to the present invention, therefore, a capacitor is provided comprised of a casing; a cathode comprising a cathode coating of at least an oxide of a first metal provided on a conductive substrate, wherein the cathode is characterized as comprising a substantially homogeneous coating formed on the conductive substrate by sputtering a target comprised of the first metal in a vacuum chamber; an anode spaced from the cathode; and an electrolyte in contact with the cathode and the anode, the casing containing the anode, the cathode and the electrolyte. The cathode coating has a thickness of about 0.1 micrometers to about 5 micrometers.

In a preferred embodiment, the first metal consists essentially of ruthenium. The target may consist essentially of ruthenium oxide, the ruthenium oxide being the material sputtered from the target. Alternatively, the target may consist essentially of ruthenium metal, the ruthenium metal being reactively sputtered in an oxygen-containing atmosphere provided in the chamber to form the ruthenium oxide coating.

The capacitor may be disposed within a metal container, the metal container forming the substrate of the capacitor, with the coating disposed directly on the inside surface of the container. The capacitor may be provided as an electrolytic capacitor.

One aspect of the invention is based on the discovery that sputter coated ruthenium oxide has higher adhesion to conductive substrates, a higher hardness, and greater homogeneity than ruthenium oxide coated by other deposition methods. This discovery avoids problems that arise in capacitors when coatings of relatively low adhesion delaminate or spall from conductive substrates. As a result of the invention, electrolytic capacitors may be provided that are suitable for use in extreme environments and that have a high energy density.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which.

Figure 1:
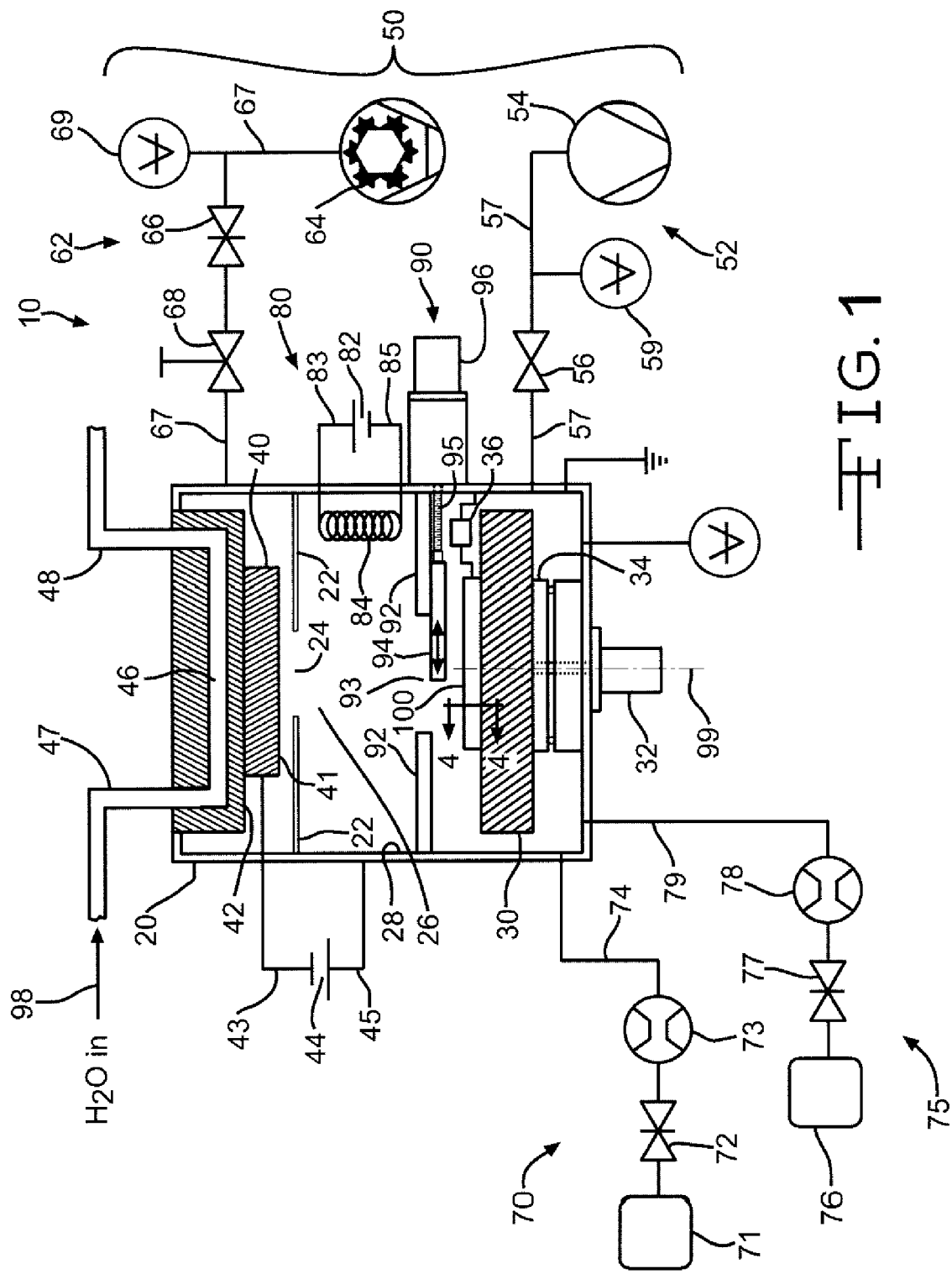
FIG. 1 is a schematic representation of a sputter deposition apparatus for the coating of cathode active materials for capacitors according to the present invention.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

For a general understanding of the present invention, reference is made to the drawings. In the drawings, like reference numerals have been used throughout to designate identical elements.

FIG. 1 is a schematic representation of a sputter deposition apparatus for the coating of cathode active materials for capacitors according to the present invention. Apparatus 10 is comprised of a vacuum chamber 20 containing a substrate 100 to be coated. Substrate 100 is supported by a substrate holder 30, which may hold substrate 100 motionless in a fixed location, or which may move substrate 100 in vacuum chamber 20 in order to improve the uniformity of the coating deposited thereon. In the embodiment depicted in FIG. 1, substrate holder 30 is disposed upon turntable assembly 34 and operatively coupled to a motor 32, which rotates substrate 100 around the central axis 99 of motor 32. Alternatively, substrate holder 30 may comprise a belt (not shown), or a one- or two-axis stage (not shown) for providing linear motion of substrate 100 in the plane perpendicular to central axis 99.

Substrate holder 30 may provide an electrical ground path such that substrate 100 is electrically grounded during the coating process. Alternatively, substrate holder 30 and substrate 100 may either be electrically isolated such that the electrical potential of substrate 100 varies during the coating process depending upon the process conditions; or substrate holder 30 and substrate 100 may have a bias voltage applied by an electrical power supply 36.

During the coating process, substrate 100 may be shielded from sputtered material, or exposed and coated by sputtered material by the operation of shutter assembly 90. Shutter assembly 90 is comprised of shutter shield 92 with opening 93 therethrough, and shutter 94, which may be operated by a lead screw 95 that is operatively coupled to stepper motor 96. It will be apparent that other suitable linear actuating means may be used to open and close shutter 94.

Apparatus 10 further comprises a target 40 that consists essentially of the material to be coated in relatively pure form. Preferably, target 40 contains at least about 99 weight percent, and more preferably about 99.95 wt. %, of the material to be coated. Target 40 is typically bonded to a target backing plate 42, but electrically isolated therefrom. The backing plate may contain a magnet (not shown) in an arrangement so plasma generation is improved at low pressures. This is commonly referred to a magnetron sputtering. The magnetic field is typically about 300 Gauss.

Target 40 is also electrically connected to a high voltage power supply 44 by conductive lines 43 and 45. High voltage power supply 44 may be configured to provide a direct current (DC) continuous voltage or pulsed voltage, or an alternating current (AC) voltage to target 40. In the instance in which a DC voltage is provided by power supply 44, target 40 is negatively charged during deposition. During other process cycles such as cleaning of the surface 41 of target 40, the polarity of target 40 may be reversed. Vacuum chamber 20 may also be provided with a target shield 22 with an opening 24 therethrough. The opening 24 is dimensioned so as to limit the passage and trajectory of material sputtered from the surface 41 of target 40 toward substrate 100, thereby improving uniformity of the coating deposited upon substrate 100.

Target backing plate 42 may also be cooled by suitable cooling means, such as by providing an internal channel 46 through target backing plate 42 and delivering water or another suitable coolant fluid indicated by arrow 98 through internal channel 46 via inlet conduit 47 and outlet conduit 48.

Apparatus 10 is also provided with a vacuum pumping system 50 comprised of a roughing pump system 52 and a high vacuum pump system 62. Roughing pump system 52 comprises roughing vacuum pump 54, valve 56, and pressure gauge 59. Roughing vacuum pump 54 is capable of evacuating vacuum chamber 20 to a pressure of about 100 milliTorr. Roughing pump 54 is in communication with chamber 20 and evacuates chamber 20 through conduit 57 when valve 56 is opened. High vacuum pump system 62 further comprises high vacuum pump 64, gate valve 66, throttle valve 68, and pressure gauge 69. Roughing pump 64 is in communication with chamber 20 and evacuates chamber 20 through conduit 67 when valves 66 and 68 are opened.

High vacuum pump 64 is capable of evacuating vacuum chamber 20 to a pressure of at least about $10^{-6}$ Torr. High vacuum pump 64 is preferably a "cryo pump", i.e. a pump that employs condensation and adsorption at cryogenic temperatures to attain such high vacuum levels. Such cryogenic pumps are well known to those skilled in the art of low pressure material processing. Turbo molecular pumps and diffusion pumps are also useful with the present process.

Apparatus 10 further comprises argon backfilling system 70 and a gaseous (oxygen, $O_2$) supply system 75. Argon backfilling system 70 is comprised of argon reservoir or tank 71, valve 72, flow controller 73, and conduit 74 that is in communication with chamber 20. Argon backfilling system 70 enables controlled backfilling of chamber 20 to a specific pressure of from about 1 milliTorr to about 100 milliTorr. Backfilling is achieved by maintaining the high vacuum pumping system 62 in communication with chamber 20, but throttled by valve 68 to a specific flow rate. Argon, or another inert gas such as xenon or krypton, is then supplied from reservoir 71 at a desired flow rate, thereby maintaining a constant argon concentration in chamber 20.

The oxygen supply system 75 is comprised of a oxygen reservoir or tank 76, valve 77, flow controller 78, and conduit 79 that is in communication with chamber 20. Oxygen supply system 75 is used to provide controlled amounts of oxygen gas into vacuum chamber 20 in instances where target 40 is a metal, rather than a metal oxide. For example, when a ruthenium metal target is used, ruthenium metal is sputtered from target surface 41 into the interior space 26 of chamber 20, and is subsequently deposited onto substrate 100. Without wishing to be bound to any particular theory, the applicants believe that the oxygen in chamber 20 reacts with ruthenium at the substrate to produce ruthenium oxide, $RuO_2$; however, the precise amount of oxygen for the creation of stoichiometrically correct $RuO_2$ is an empirical relationship with many variables governing the deposition process.

In the event that a compound other than an oxide is desired, the supply system 75 is used to introduce the requisite gaseous precursor into the chamber 20. For example, if a nitride of the metal is desired, nitrogen is used in lieu of oxygen. For production of a metal carbide, methane is introduced into the chamber 20. For a carbonitride, two deposition techniques are used at the same time or sequentially. In that case, the metal is sputter deposited in conjunction with low-pressure, plasma-enhanced CVD of carbon from acetylene in the presence of nitrogen. Furthermore, when a metal oxide, nitride, carbide, or carbonitride target is used, such as one of ruthenium oxide, the provision and use of the gaseous supply system 75 is not necessarily needed to obtain the desired coating on substrate 100.

Apparatus 10 is further comprised of an ion source 80, which ionizes the gas contained in the interior space 26 of chamber 20 during the coating process. Ion source 80 is comprised of a power supply 82 that is electrically connected to coil 84 by conductors 83 and 85.

The process in which a coating is applied to substrate 100 by apparatus 10 will now be described. However, before this takes place it is critical that the substrate 100 surface to be coated is properly prepared to ensure coating quality. For one, substrate surface cleanliness is very important in all coating systems. In that respect, it is required that the substrate surface remain uncontaminated by lubricants from handling equipment or body oils from hands and the like. Substrate cleaning includes chemical means such as conventional degreasing treatments using aqueous and non-aqueous solutions as well known to those skilled in the art. Plasma cleaning is also contemplated.

After substrate surface cleaning, surface roughness is the next most critical factor. The substrate 100 may be roughened by chemical means, for example, by contacting it with hydrofluoric acid and/or hydrochloric acid containing ammonium bromide and methanol and the like, by plasma etching, and by mechanical means such as scraping, machining, wire brushing, rough threading, grit blasting, a combination of rough threading then grit blasting and abrading such as by contacting the substrate with Scotch-Brite™ abrasive sheets manufactured by 3M.

If desired, the electrical conductivity of substrate 100 is improved prior to coating. Metal and metal alloys have a native oxide present on their surface. This is a resistive layer and hence, if the material is to be used as a substrate for a capacitor electrode, the oxide is preferably removed or made electrically conductive prior to deposition of a pseudocapacitive coating, such as of ruthenium oxide, thereon. In order to improve the electrical conductivity of the substrate, various techniques can be employed. One is shown and described in U.S. Pat. No. 5,098,485 to Evans, the disclosure of which is hereby incorporated by reference. A preferred method for improving the conductivity of the substrate includes depositing a minor amount of a metal or metals from Groups IA, IVA and VIIIA of the Periodic Table of Elements onto the substrate. Aluminum, manganese, nickel and copper are also suitable for this purpose. The deposited metal is then "intermixed" with the substrate material by, for example, a high energy ion beam or a laser beam directed towards the deposited surface. These substrate treating processes are performed at relatively low temperatures to prevent substrate degradation and deformation. Additionally, these treating processes can be used to passivate the substrate from further chemical reaction while still providing adequate electrical conductivity. For additional disclosure regarding improving the electrical conductivity of the substrate 100 prior to deposition, reference is made to U.S. Patent Application Pub. No. 2005/0266261 and U.S. Pat. Nos. 6,096,391, 6,599,580 and 6,740,420, all to Muffoletto et al., and assigned to the assignee of the present invention and incorporated herein by reference.

Referring again to FIG. 1, the thusly prepared substrate 100 is affixed to substrate holder 30, and vacuum chamber 20 is sealed. Roughing pump system 52 is actuated by operating roughing vacuum pump 54 and opening valve 56. Vacuum chamber 20 is evacuated to a pressure of about 100 milliTorr. Roughing valve 56 is then closed. High vacuum pump system 62, which runs continuously, is connected to the system by operating high vacuum pump 64 and opening gate valve 66 and throttle valve 68 to the full open position. Vacuum chamber 20 is evacuated to a pressure of at least about $10^{-6}$ Torr with the high vacuum pump system 62. Throttle valve 68 is then partially closed to reduce the rate of evacuation of gas from chamber 20.

Argon valve 72 is opened and argon gas is delivered from reservoir 71 into chamber 20 at a controlled flow rate via flow controller 73. The combination of the setting of vacuum throttle valve 68 and argon flow controller 73 may be used to provide a steady-state pressure in chamber 20 of from about 1 milliTorr to about 100 milliTorr. In the instance where a pure metal is provided as target 40, such as ruthenium metal, a flow of oxygen from reservoir 76 into chamber 20 is begun by opening valve 72. The flow of oxygen is maintained at the flow rate that provides the desired concentration of oxygen in chamber 20 by flow controller 78. If desired, a gas detector (not shown) may be used to provide feedback control.

The high voltage power supply 44 is turned on, providing a voltage at target 40 of between about 200 volts to about 5,000 volts.

Figure 2:
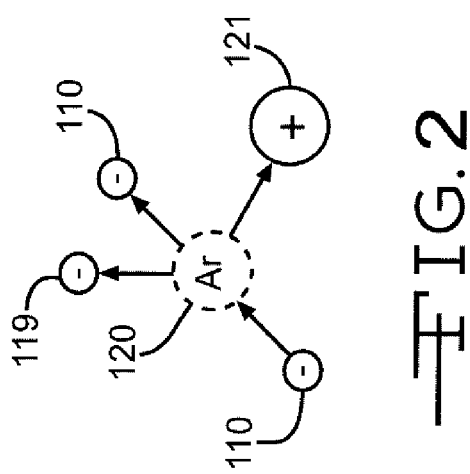
FIG. 2 is a schematic representation of the production of ions by an ion source disposed within the vacuum chamber of a sputter deposition apparatus.

Ion source 80 is turned on to generate plasma within the interior space 26 of chamber 20. Coil 84 emits electrons into the interior space 26 of chamber 20. FIG. 2 is a schematic representation of the production of ions by ion source 80 within chamber 20. An energetic electron 110 from coil 84 collides with argon atom 120, thereby producing an electron 119 in addition to electron 110 that are separated from argon ion 121. Since power supply 44 is applying a negative voltage to target 40, the positively charged argon ion 121 is accelerated toward target 40 by the electric field present within chamber 20. Argon ion 121 impacts surface 41 of target 40 with high kinetic energy.

Figure 3:
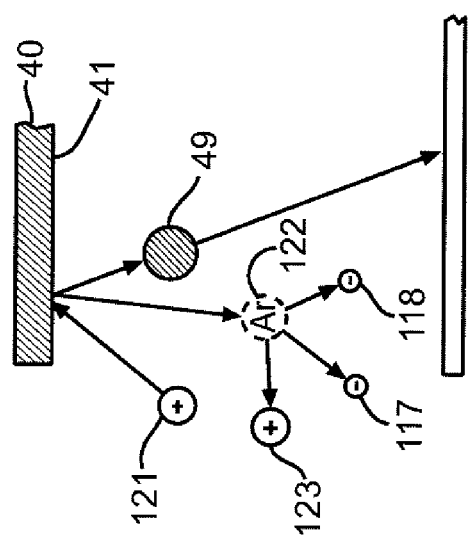
FIG. 3 is a schematic representation of the discharge of an atom of a target material by the impact of an ion on the target surface, with the associated generation of secondary electrons that sustain plasma within the vacuum chamber of the apparatus.

FIG. 3 is a schematic representation of the discharge of an atom of target material by the impact of an ion on the surface 41 of target 40, with the associated generation of secondary electrons that sustain plasma within the vacuum chamber 20 of the apparatus 10. The impact of argon ion 121 upon surface 41 results in the ejection or "sputtering" of an atom 49 of target material into the interior 26 of chamber 20. The impact of argon ion 121 upon surface 41 also results in the emission of high energy electrons such as electron 118 back into the plasma in chamber 20. Electron 118 collides with argon atom 122, which in turn dissociates into argon ion 123 and electron 117. The argon ion is then accelerated towards target 40 as was described for argon ion 121. Under certain process conditions, the generation of argon ions, and the sputtering of target atoms and high energy electrons may attain a steady state wherein the plasma in chamber 20 is self-sustaining. Thus, ion source 80 is not required to maintain the sputtering process under these conditions, and may be turned off.

Sputtered atom 49 may be ejected over a range of trajectories directed away from target surface 41, and may impact target shield 22, inner surface 28 of chamber 20, or shutter shield 92. Sputtered atom 49 may also be ejected with a velocity such that sputtered atom 49 is directed through opening 24 in target shield 22, and toward closed shutter 94. The process may be initially operated with shutter 94 closed to allow the process to reach steady state with respect to the generation of sputtered atoms and the self-sustainment of plasma within chamber 20.

Up to this point in the process, shutter 94 has been in the closed position, i.e. opening 93 in shutter shield 92 is fully blocked by shutter 94. To begin the deposit of target material onto substrate 100, shutter 94 is opened. (Shutter 94 is shown in approximately the half-open position in FIG. 1.) Sputtered atoms such as atom 49 may then pass through opening 93 past shutter 94, and be deposited upon substrate 100 to form a coating of target material thereupon. The operation of shutter 94 during the coating process also allows for control of the coating deposition time independent of the time during which target 40 is "on," i.e. energized by power supply 44.

When atoms of target material such as atom 49 are deposited onto the substrate 100, the coated target material may be reacted with other gases introduced into chamber 20, such as e.g., molecular oxygen ($O_2$). In one embodiment of the present invention, a target of ruthenium metal is used to deposit ruthenium atoms onto substrate 100. If the appropriate amount of oxygen is introduced into chamber 20, the ruthenium atoms are subsequently oxidized to form a coating of ruthenium oxide, $RuO_2$.

It should be pointed out that while ruthenium is a preferred cathode active material, other active materials are contemplated by the scope of the present invention. They include cobalt, manganese, molybdenum, tungsten, tantalum, iron, niobium, iridium, titanium, zirconium, hafnium, rhodium, vanadium, osmium, palladium, platinum, nickel, and lead.

When the desired coating thickness has been achieved, the coating of substrate 100 is stopped by closing shutter 94. Specifically, the sputtering process is stopped by turning off high voltage power supply 44 connected to target 40. Vacuum chamber 20 is vented to the external atmosphere, and the coated substrate is removed from vacuum chamber 20.

Figure 4:
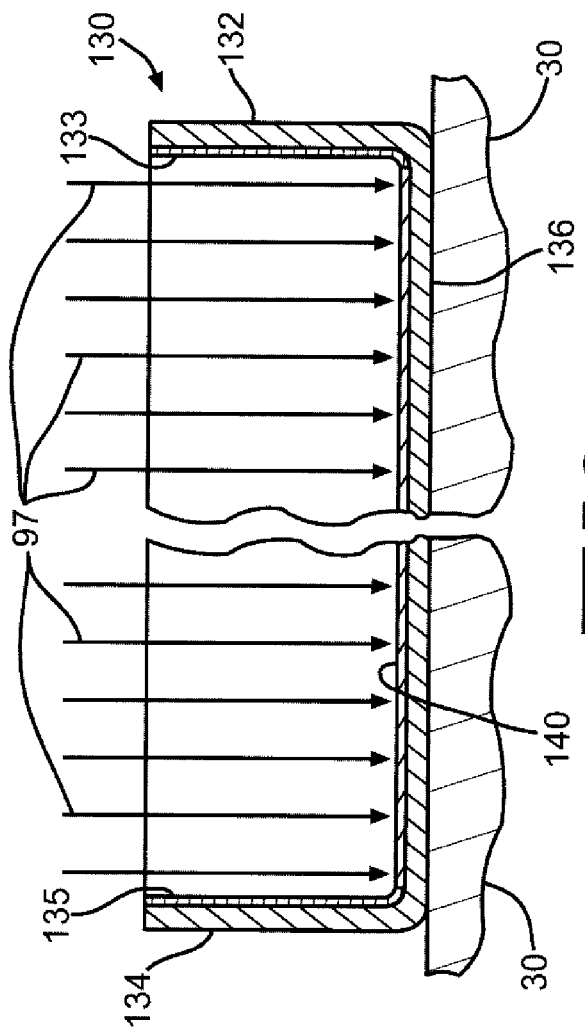
FIG. 4 is a cross-sectional view of an active coating being deposited on an interior surface of a capacitor container during the sputter deposition process of the present invention, taken along line 4-4 of FIG. 1.

FIG. 4 is a cross-sectional view taken along line 4-4 of FIG. 1 of a coated film being deposited on an interior surface of a capacitor casing portion 130 during the sputter deposition process of the present invention. Casing portion 130 is fully formed, or at least partially pre-formed, as a recessed container having side walls 132 and 134, and flat bottom 136. Casing portion 130 is preferably made of titanium or tantalum. Other suitable materials for the casing portion 130 include molybdenum, niobium, cobalt, nickel, stainless steel, tungsten, platinum, palladium, gold, silver, copper, chromium, vanadium, aluminum, zirconium, hafnium, zinc, iron, and mixtures and alloys thereof. Before starting the coating process, casing portion 130 is disposed upon substrate holder 30 with its flat bottom 136 being contiguous with substrate holder 30. The inner surfaces of side walls 132 and 134 are covered with masking films 133 and 135, such as metal foil or thermally resistant tape.

Apparatus 10 is operated according to the coating process previously described herein. A flux of coating material, such as ruthenium metal ions, is delivered to the casing portion 130 as a cloud indicated by arrows 97, resulting in the deposition of a coated film 140 on the inner surface of the flat bottom 136. Coating material is prevented from depositing upon side walls 132 and 134 by masking films 133 and 135.

Figure 5:
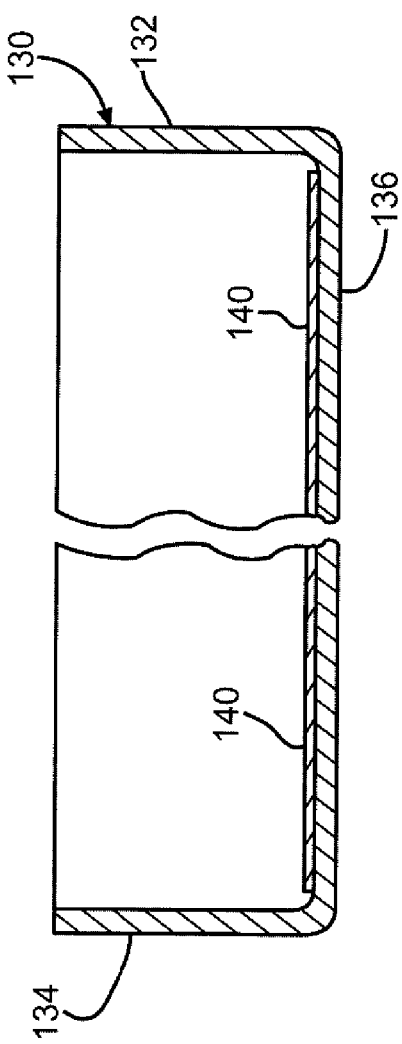
FIG. 5 is a cross-sectional view of the container of FIG. 4 including an active coating deposited upon the bottom surface thereof, after completion of the sputter deposition process.

When the process is completed, casing portion 130 is removed from chamber 20 (see FIG. 1), and masking films 133 and 135 are removed from side walls 132 and 134 thereof. FIG. 5 is a cross-sectional view of the casing portion 130 of FIG. 4 after completion of the coating process. The coating 140, such as a film of ruthenium oxide, has been selectively contacted only on the bottom surface 136 of the casing portion 130. The coated casing portion 130 may subsequently be used in an electrolytic capacitor, with coating 140 serving as a cathode active material.

It is preferred that the resulting cathode active coating, whether it be of an oxide, a nitride, a carbon nitride or a carbide, have a thickness of from about a few hundred Angstroms to about 0.1 millimeters or more.

To provide a capacitor, the resulting cathode is coupled with an anode. The anode is typically of a metal selected from the group consisting of tantalum, aluminum, titanium, niobium, zirconium, hafnium, tungsten, molybdenum, vanadium, silicon and germanium, and mixtures thereof in the form of a pellet. As is well known by those skilled in the art, the anode metal in powdered form, for example tantalum powder, is compressed into a pellet having an anode lead electrically connected thereto, and sintered under a vacuum at high temperatures. The porous body is then anodized in a suitable electrolyte to fill the pore with the electrolyte and to form a continuous dielectric oxide film on the sintered body. The assembly is then reformed to a desired voltage to produce an oxide layer over the terminal lead/anode lead weld. The anode can also be of an etched aluminum or titanium foil or, a sintered aluminum or titanium body.

A separator structure of electrically insulative material is typically provided between the anode and the cathode to prevent an internal electrical short circuit between the electrodes. The separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the capacitor. Illustrative separator materials include woven and non-woven fabrics of polyolefinic fibers including polypropylene and polyethylene or fluoropolymeric fibers including polyvinylidene fluoride, polyethylenetetrafluoroethylene, and polyethylenechlorotrifluoroethylene laminated or superposed with a polyolefinic or fluoropolymeric microporous film, non-woven glass, glass fiber materials and ceramic materials. Suitable microporous films include a polyethylene membrane commercially available under the designation SOLUPOR (DMS Solutech), a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). Cellulose based separators also typically used in capacitors are contemplated by the scope of the present invention. Depending on the electrolyte use, the separator can be treated to improve its wettability, as is well known by those skilled in the art.

While a separator is preferred, it is an aspect of the invention that one may not be necessary. As a sintered body, it is very unlikely that any of the anode metal will break loose from the body and contact the cathode. Similarly, the cathode active material is extremely adherent to its substrate, for example the inside surface of the casing, and it is very unlikely that any will slough off to make direct physical contact with the anode. For this reason, it is only necessary that there be a physical space separation between the anode and the cathode. Since a separator is not required, more active materials can be provided in the casing, thereby increasing the capacitor's volumetric efficiency.

A working electrolyte solution is filled into the casing to contact both the anode and cathode and render the capacitor functional. Any electrolyte that provides acceptable capacitive performance over a desired operating range is contemplated. Suitable electrolytes include sulfuric acid in an aqueous solution. Specifically, a 38% sulfuric acid solution has been shown to perform well at voltages of up to about 125 volts. A 10% to 20% phosphoric acid/water solution is known to provide an increased equivalent series resistance (ESR) and breakdown voltage. Other suitable electrolytes are contemplated that provide desired performance characteristics.

The process of the present invention provides for coating the substrate 100 at a deposition rate of from about 0.01 to about 10 microns per minute and, preferably, from about 0.1 to about 1.0 microns per minute. The thickness of the active coating on the substrate 100 may be determined by means well known to those skilled in the art.

EXAMPLE

A ruthenium oxide coating was prepared using the process and apparatus of the present invention as follows:

A vacuum coating chamber was provided, into which was placed a 76 millimeter diameter ruthenium target of about 99.95 weight percent purity, and a substrate of titanium metal. The chamber was evacuated to a pressure of about $10^{-6}$ Torr. Argon was delivered into the chamber. Oxygen was also delivered to the chamber at a flow rate of 50 standard cubic centimeters per minute, with the steady state pressure in the chamber from the argon/oxygen mix being 7 milliTorr. A DC power supply connected to the target provided 500 watts of power to the target. The shutter in the chamber was opened, and a coating of from about 0.1 to 5 micrometers in thickness was deposited upon the substrate. A highly adherent coating of ruthenium oxide was obtained as measured by a commonly used adhesion tape test in which a piece of tape is applied to the coating and then quickly removed. In addition, the coating was significantly more abrasion resistant than coatings obtained by spray coating or pad printing. Wiping of the surface of the vacuum sputtered coating with a cotton applicator removed only minimal dust-like particles from the coated surface, whereas coatings deposited by spraying or pad printing were easily removed by a cotton applicator. A hard metal object was required to scratch the surface of the sputtered ruthenium oxide coating.

It is, therefore, apparent that there has been provided, in accordance with the present invention, a capacitor comprised of a cathode comprising a cathode coating of at least an oxide of a first metal provided on a substrate, wherein the cathode coating is characterized as comprising a substantially homogeneous film formed by sputtering a target comprised of the first metal in a vacuum chamber; and a method and apparatus for providing the sputtered coating. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for providing a capacitor, comprising the steps of:
   a) providing a casing comprising a first casing portion and a second casing portion;
   b) positioning at least one of the first and second casing portions in a sputter deposition apparatus;
   c) sputtering a target comprised of a first metal in a vacuum chamber of the sputter deposition apparatus, thereby providing a substantially homogeneous coating of the first metal on at least a portion of the at least one casing portion;
   d) housing an anode inside one of the first and second casing portions spaced from the cathode;
   e) mating the first casing portion to the second casing portion, thereby housing the anode and the cathode therein spaced from each other; and
   f) providing an electrolyte in the casing contacting the cathode and the anode.

2. The method of claim 1 including providing the cathode coating having a thickness of from about 0.1 micrometers to about 5 micrometers.

3. The method of claim 1 including selecting the first metal from the group consisting of ruthenium, cobalt, manganese, molybdenum, tungsten, tantalum, iron, niobium, iridium, titanium, zirconium, hafnium, rhodium, vanadium, osmium, palladium, platinum, nickel, lead, and mixtures thereof.

4. The method of claim 1 including introducing a gaseous material into the vacuum chamber to provide the homogeneous coating of the first metal as a compound thereof.

5. The method of claim 1 including providing the target consisting essentially of ruthenium as the first metal reactively sputtered in an oxygen-containing atmosphere in the vacuum chamber to provide the coating being of ruthenium oxide.

6. The method of claim 1 including providing the target consisting essentially of ruthenium dioxide.

7. The method of claim 1 including selecting the first and second casing portions from a second metal selected from the group consisting of titanium, tantalum, molybdenum, niobium, cobalt, nickel, stainless steel, tungsten, platinum, palladium, gold, silver, copper, chromium, vanadium, aluminum, zirconium, hafnium, zinc, iron, and mixtures and alloys thereof.

8. The method of claim 1 including supporting the one of the first and second casing portions on a holder in the vacuum chamber, wherein the holder is provided with an electrical potential with respect to the casing portion selected from the group consisting of being electrically grounded, electrically isolated, and electrically biased.

9. The method of claim 1 including electrically connecting the target to a high voltage power supply that provides one of the group consisting of a direct current continuous voltage, pulsed voltage, and alternating current voltage to the target.

10. The method of claim 1 including providing the capacitor devoid of a separator intermediate the anode and the cathode.

11. The method of claim 1 including providing the capacitor as an electrolytic type having the cathode associated with a tantalum anode.

* * * * *